United States Patent Office 3,268,531
Patented August 23, 1966

3,268,531
S-SULFOTHIAMINES
Kiyoshi Takiura, Kobe, Masaru Hieda, Osaka, and Shojiro Yurugi, Kyoto, Japan, assignors to Takeda Chemical Industries, Ltd., Higashi-ku, Osaka, Japan
No Drawing. Filed Feb. 17, 1964, Ser. No. 345,127
Claims priority, application Japan, Feb. 22, 1963, 38/9,124
4 Claims. (Cl. 260—256.5)

This invention relates to the compounds represented by the following formula

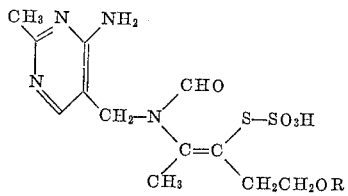

wherein R is hydrogen or an acyl radical, and their production.

While there have been known a variety of thiamine salts as well as thiamine derivatives, they are accompanied more or less by such drawbacks as being chemically unstable, or having a peculiar odor or a bitter taste.

The present inventors succeeded in synthesizing novel compounds which are entirely different in chemical structure from so far known thiamine derivatives, and found that the novel compounds, which are in a stable crystalline state, display a strong vitamin $B_1$-activity, are readily soluble in water, and have no unpleasant odor nor bitter taste at all. Practically, S-sulfothiamines of this invention being readily soluble in water and stable for a long time in their aqueous solution, these are of great utility value, especially in use as liquid preparation or chewable tablet. S-sulfothiamines of this invention are soluble in water at room temperature in an amount of about 2–3% on the weight basis. And the aqueous solution is stable, which was confirmed by test conducted in the following manner:

Two kinds of buffer solutions,[1] respectively adjusted to pH 2.9 and 6.1, in which S-sulfothiamine was dissolved at a concentration of 0.1%. The respective solutions were sealed in five groups of ampoules wherein the air was replaced with nitrogen gas. So prepared ampoules were heated at 100° C., then the respective solutions in the ampoules were subjected to the thiochrome test method to determine quantitatively S-sulfothiamine and free thiamine contained therein, the results being shown in the following table. The figures shown in the table are the molor ratios in percentage relative to the S-sulfothiamine originally dissolved.

| Time (Hours) | pH 2.9 | | pH 6.1 | |
|---|---|---|---|---|
| | S-Sulfothiamine (percent) | Free thiamine (percent) | S-Sulfothiamine (percent) | Free thiamine (percent) |
| 0 | 100 | 0 | 100 | 0 |
| 0.5 | 99.3 | 0.1 | 95.1 | 0.5 |
| 1 | 97.2 | 0.3 | 91.9 | 0.8 |
| 3 | 93.0 | 0.7 | 84.8 | 2.0 |
| 6 | 89.2 | 1.3 | 78.1 | 3.4 |

In the present invention, the desired S-sulfothiamines are obtained by allowing thiamine disulfide or its O-acyl derivatives representable by the formula,

[1] Compositions of the respective buffer solutions (pH 2.9 and pH 6.1) are acetic acid-sodium acetate and sodium dihydrogenphosphate-disodium hydrogenphosphate in this order.

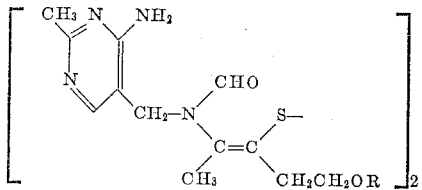

wherein R represents hydrogen or acyl groups, to react with sulfurous acid or its alkali salts such as alkali hydrogensulfite or alkali sulfite, the alkali being for example sodium, potassium and ammonium, whereby the —S—S— part of the starting materials is converted into —S—$SO_3H$.

While the starting materials, thiamine disulfide or its O-acyl derivatives, are generally available in the free form, they may sometimes be available in the form of acid salts such as hydrochloride, nitrate or sulfate, and all of these compounds are employable in the present invention.

As the O-acyl derivatives of thiamine disulfide, there are counted those which have such a structure that hydrogen of the hydroxyl group of thiamine dissulfide is replaced by an acyl group, especially an acyl group having up to 7 carbon atoms, such as acetyl, propionyl, butyroyl, benzoyl, furoyl, ethoxycarbonyl or benzyloxycarbonyl.

The present invention is practically effected by allowing thiamine disulfide or its O-acyl derivatives to react with a compound cable of converting the —S—S— part thereof into —S—$SO_3H$, such as sulfurous acid or its alkali salts as mentioned above. The reaction is preferably carried out in a neutral or an acid aqueous solution.

While the reaction proceeds satisfactorily at room temperature, it may be effected at an elevated or lowered temperature, if desired. The reaction may be effected by introducing for example sulfur dioxide gas into an aqueous solution of thiamine disulfide or its O-acyl derivatives, or by adding thereto an aqueous solution saturated with sulfur dioxide gas or an aqueous solution of alkali salts of sulfurous acid.

As afore-mentioned, O-acyl-S-sulfothiamine may be obtained via O-acyl derivatives of thiamine disulfides, or alternatively may be obtained by converting thiamine disulfide into S-sulfothiamine, followed by subjecting the latter to acylation in per se conventional manner.

The invention is described in further particularity by means of the following examples. It will be understood that the invention is not limited to the particular details of these examples, which are illustrative. In these examples, the relationship between part by weight and part by volume is the same as that between gram and milliliter. The temperatures are all uncorrected.

*Example 1*

A solution of 20 parts by weight of thiamine disulfide in 500 parts by volume of water was saturated with sulfur dioxide gas under cooling. After standing for three days at room temperature, the reaction mixture was concentrated to about 100 parts by volume under reduced pressure at 35° C. 2-methyl-4-aminopyrimidinyl-(5) methane-sulfonic acid separated as by-product was removed by filtration under warming. Upon cooling, crystals separated out. Recrystallization from warm water of them gave 10 parts by weight of crystals of S-sulfothiamine, containing one molecule of crystal water and melting at 138°–140° C.

Thus obtained S-sulfothiamine was dissolved in an aqueous solution of sodium hydroxide under warming and recrystallized therefrom to give sodium salt of S-sulfothiamine.

Example 2

To a suspension of 1 part by weight of O-acetylthiamine disulfide in 30 parts by volume of water was added 10% hydrochloric acid to make the suspension clear. The solution was adjusted to pH 5 with sodium hydrogensulfite. After standing for six days at room temperature, the mixture was concentrated under reduced pressure to give 0.43 part by weight of O-acetyl-S-sulfothiamine as crystals melting at 220° C.

Thus obtained O-acetyl-S-sulfothiamine was recrystallized from an aqueous solution of sodium hydroxide to give sodium salt of O-acetyl-S-sulfothiamine.

Example 3

To a suspension of 2 parts by weight of O-benzoylthiamine disulfide in 40 parts by volume of water was added 12 parts by volume of 10% hydrochloric acid to make the suspension clear. To the solution was added a solution of six parts by weight of sodium hydrogensulfite in 20 parts by volume of water. The reaction mixture was left standing for 15 hours at room temperature to give 1.3 parts by weight of crude crystalline O-benzoyl-S-sulfothiamine, which was recrystallized from 50 parts by volume of 80% methanol to obtain 1 part by weight of colorless needles melting at 220°–222° C. with decomposition.

In the same manner as in Examples 1, 2 and 3, the following compounds were obtained:

O-propionyl-S-sulfothiamine;
O-butyroyl-S-sulfothiamine;
O-furoyl-S-sulfothiamine;
O-ethoxycarbonyl-S-sulfothiamine; and
O-benzyloxycarbonyl-S-sulfothiamine.

Having thus disclosed the invention, what is claimed is:
1. A compound having the formula

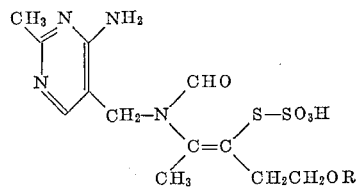

wherein R is a member selected from the class consisting of H, alkylcarbonyl with up to 7 carbon atoms, benzoyl, furoyl, ethoxycarbonyl and benzyloxycarbonyl.
2. S-sulfothiamine.
3. O-acetyl-S-sulfothiamine.
4. O-benzoyl-S-sulfothiamine.

References Cited by the Examiner

UNITED STATES PATENTS 2,752,348  6/1956  Matsukawa et al. ___ 260—256.5

OTHER REFERENCES

Hackh's Chem. Dictionary, 3rd ed., The Blakiston Co., Philadelphia, 1944, pages 18 and 818–819.

Houben-Weyl: Methoden der Organischen Chemie, 4th ed., volume IX, 1955, page 79.

ALEX MAZEL, *Primary Examiner.*

HENRY R. JILES, *Examiner.*

M. O'BRIEN, *Assistant Examiner.*